United States Patent Office 3,573,018
Patented Mar. 30, 1971

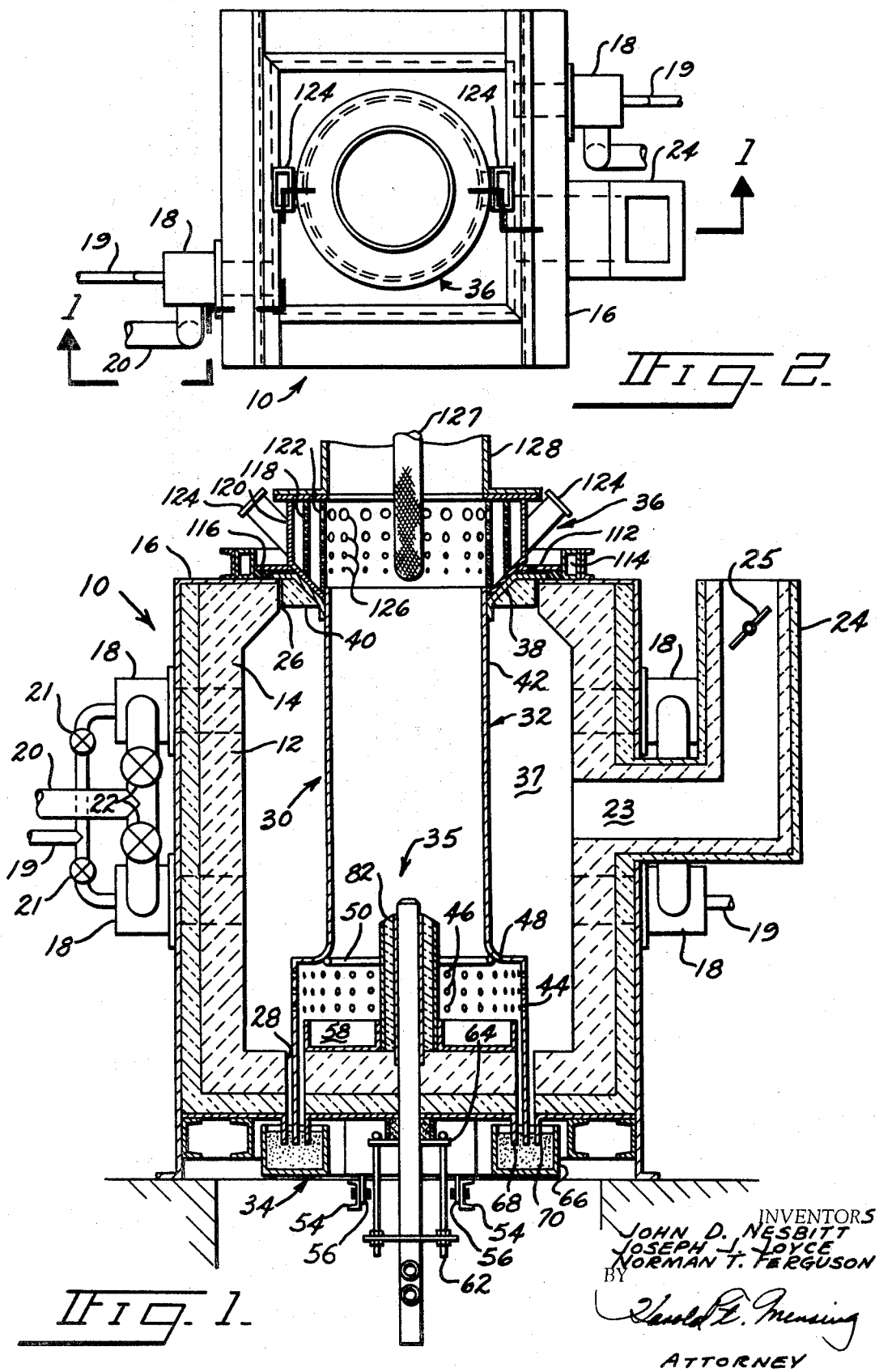

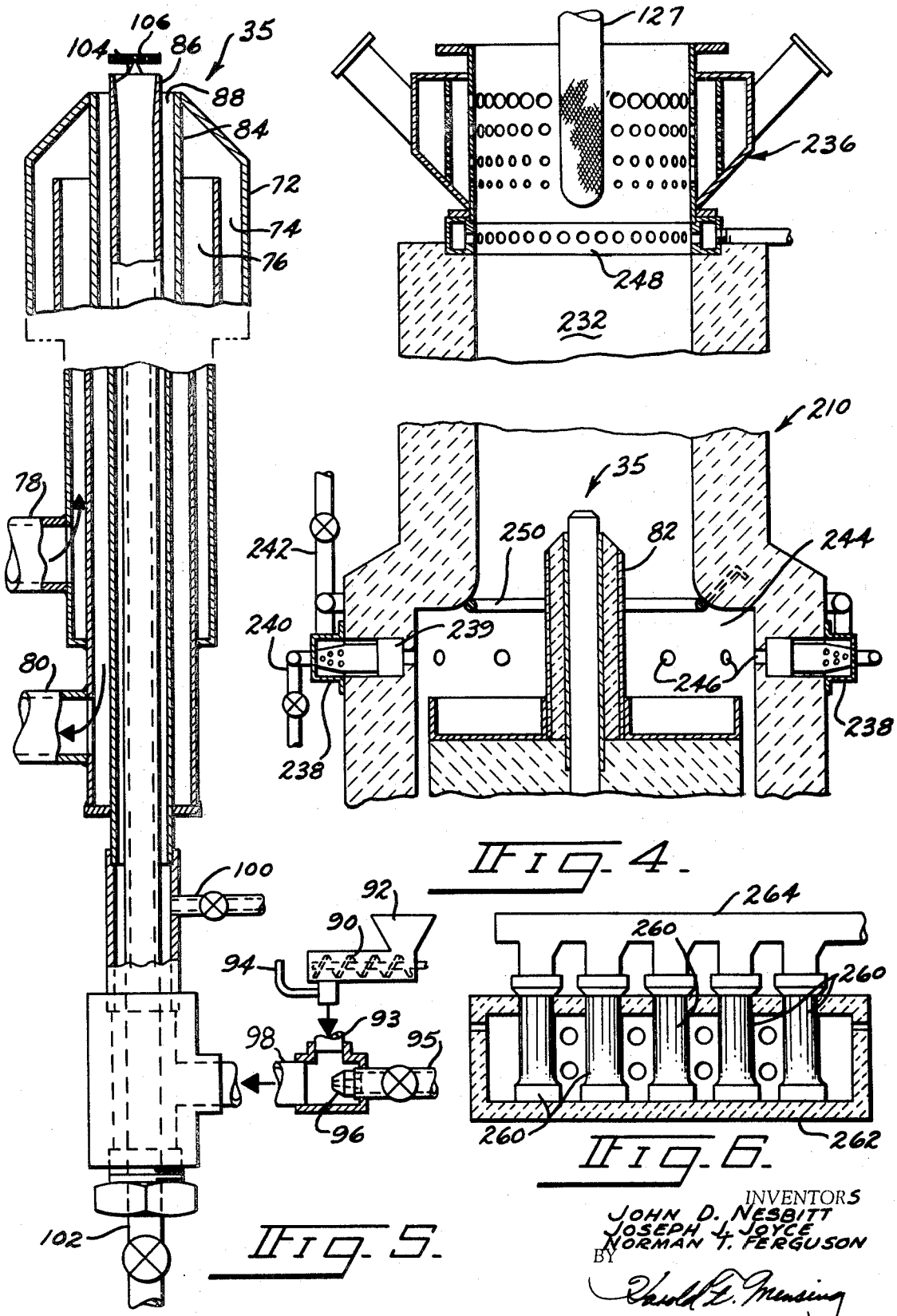

3,573,018
APPARATUS AND METHOD FOR HEAT TREATING PARTICULATE MATTER
John D. Nesbitt and Joseph J. Joyce, Toledo, and Norman T. Ferguson, Maumee, Ohio, assignors to Midland-Ross Corporation, Toledo, Ohio
Filed June 27, 1968, Ser. No. 740,588
Int. Cl. C03b 19/10
U.S. Cl. 65—21
24 Claims

ABSTRACT OF THE DISCLOSURE

A furnace for the thermal processing of discrete particles including heat fusible particles of minute size which reduce in density upon being subjected to adequate heat. The particles to be treated are dispersively launched into a hot gas wind stream passing through a heating chamber. The particles are heated by radiation and convection while their density is reduced and while the wind stream conveys them through the heating chamber. A quench manifold may be provided for laterally injecting a cooling medium into the stream of hot gases and particles exiting the heating chamber.

BACKGROUND OF INVENTION

The furnace apparatus and method disclosed herein may be used for heat treating or incinerating a wide variety of solid or liquid particles. For example, it is particularly well adapted to the process of forming minute size hollow glass spheres and will be described with reference to this process.

Certain formulations of siliceous materials, such as those described in U.S. Pats. No. 3,030,215 issued to F. Veatch et al. on Apr. 17, 1962 and No. 3,365,315 issued to Beck et al. on Jan. 23, 1968, can be transformed from solid particles or powders into hollow glass spheres. The process involves the dispersive introduction of particles into a furnace where they are pneumatically suspended in a gaseous stream and heated to their heat fusible temperature in a heating chamber. A gas producing substance, entrained in the articles, expands as the heat of fusion is reached, resulting in the formation of glass bubbles or balloons having substantially less density than the original particles. The additional buoyancy promotes the pneumatic conveyance of the glass balloons out of the heating zone into a cooling or quench zone where they are cooled while still being suspended in the conveying gas stream, which ultimately carries them to a collection device.

The average density of the resulting hollow glass spheres is about .3 to .5 gram per cubic centimeter and their diameters may range from about 10 microns to several hundred microns. If these hollow spherical glass products have unruptured walls of uniform thickness, they exhibit great strength when they are subjected to isostatic pressure. These features make such hollow glass spheres well suited for use as a buoyant material at low depths, a filler for plastics, a packaging material, an insulative material, and for catalytic use in chemical and physical reactions.

To obtain high strength hollow glass spheres, it is important to subject each sphere forming particle uniformly to the heat of the furnace for a sufficient length of time to insure the formation of a well-blown hollow glass sphere. Insufficient heating time results in an incompletely formed product, while overheating causes excessive expansion and rupture of the hollow glass sphere or balloon. The ruptured ballons may remain in that form or may reform into a solid bead, depending upon the amount of overheating and how soon thereafter that the ruptured balloons are quenched. Previous methods and apparatus have not been completely satisfactory because the compressive strength of these glass balloons was not consistently high and the rate of their production was insufficient to make them economically available for general use.

Prior art furnaces have been developed for discretely heat treating particulate matter while the particles are suspended in and conveyed through a heating chamber by means of wind streams. Examples of such furnaces are found in U.S. Pats. 2,421,902 issued to R. Neuschotz on June 10, 1947; 2,838,881 issued to E. Plumat on June 17, 1958; and 3,230,064 issued to F. Veatch et al. Jan. 18, 1966. One of the major problems encountered by these furnaces was the lack of uniformity of heat treatment of the individual particles which resulted in the production of non-uniform products. Some of the particles were overheated, while at the same time other particles were underheated. The problem existed partly because the temperatures and velocities varied widely throughout the heating chamber. This was particularly true when the primary source of heat was derived from a burner firing directly into the heating chamber. It is well known that temperatures in the different regions within a flame vary greatly. In many cases particles were fed into the furnace by means of a pneumatic launching device directly associated with an upwardly directed burner in such a manner that the particle feed rate, flame propagation, furnace temperature, and the velocity of the particle conveying wind streams were interdependent. Also, large eddies were generally formed in the vicinity of the outlets of the burner and the launching device. As a result, some of the launched particles became trapped in these eddies for a period of time sufficient to cause them to be overheated. Many of the prior art particle launching devices did not insure a uniform distribution of the particles into the hot gas stream. These factors greatly limited the optimum production of the furnace and usually required a drastic choice between quality and quantity.

Additional problems were encountered in using such furnaces to heat treat heat fusible particles, such as glass. After being brought to their heat fusible temperatures, the particles tended to attach, solidify and collect on any cold surface which they contacted. Clusters of solidified material eventually dislodged from the cold surface and fell into and around burner orifices. The build-up of this fused product quickly made the furnaces inoperative and required extensive clean-out and maintenance to return these furnaces to production. Also, upon striking a hot surface the particles gathered in pools or ran down the surface. Where the hot surface comprised a refractory wall of the heating chamber, and an excessive quantity of fused glass material came in contact with the hot refractory surface, the refractory material deteriorated.

A further problem involved the loss of product or damage thereto when heat fusible hollow glass spheres or balloons were produced but were not quickly cooled to a temperature below their heat fusible temperature. Damage and loss occurred when, upon contact, the balloons adhered to each other or to a portion of the furnace apparatus such as the walls of the quench zone or collection system. The balloons in the central portion or core of a conveying wind stream were the most difficult to cool and sometimes were not cooled until long after they left the quench zone. Another problem, associated with the quench zones of prior art furnaces of this type, was that these furnaces generally ran with a deficiency of combustion air. Therefore, when quench air was supplied to the stream of particles and hot gases flowing out of the heating chamber, uncontrolled after-burning resulted.

Therefore, it is an object of this invention to produce a furnace for heat treating or incinerating particulate material, while discretely suspending and conveying the particles to be heat treated, wherein the temperature and velocity in the heating chamber are substantially uniform.

It is another object of this invention to produce such a furnace wherein the particle feed rate, the wind stream velocity, and the heating chamber temperature can be controlled independently of each other so as to optimize the quality and quantity of product obtained from the furnace.

It is still another object of this invention to provide such a furnace with an improved particle launching device for dispersing the particles uniformly throughout the hot gas stream flowing through the heating chamber of the furnace.

It is still another object of this invention to produce such a furnace for heat treating fusible particles wherein the particle feed input nozzle, the hot gas supply means, and the cooling section walls are protected against the collection of fusible produce thereon.

It is a further object of this invention to provide such a furnace with a pneumatic quench system adjacent the outlet end of the heating chamber, wherein the cooling fluid is positively injected laterally with respect to the mass flow out of the heating chamber.

It is a still further object of this invention to produce such a device which is of simple, durable construction, efficient in operation, and easy to maintain.

The above mentioned features and other objects and advantages, as well as the manner of attaining them, will be apparent from the following description of the embodiments of this invention in view of the accompanying drawings.

BRIEF DESCRIPTION OF THE DRAWINGS

FIG. 1 is a sectional elevational view taken along line 1—1 of FIG. 2 showing the general assembly of an embodiment of a particle heat treating furnace apparatus of this invention, which furnace has a refractory chamber containing a heat treating cell of metal alloy and includes a particle launch device and quench manifold.

FIG. 2 is a plan view on a reduced scale of the furnace shown in FIG. 1.

FIG. 4 is a sectional elevational view of another embodiment of this invention with parts broken away showing a heat treat furnace apparatus similar to that shown in FIG. 1, but having a particle heating chamber made of refractory material and having an after-burner at the top of the heating chamber adjacent the quench manifold.

FIG. 5 is a partially sectioned elevational view of the particle feeding and launching apparatus of this invention with parts broken away showing the outlet end of the launch tube on a greatly enlarged scale, the balance of the launch tube on a moderately enlarged scale, and the particle hopper and feed mechanism on a greatly reduced scale.

FIG. 6 is a sectional elevational view on a reduced scale showing a plurality of particle heating cells, similar to the single cell shown in FIG. 1, contained in one refractory combustion chamber and linked to a common collection system manifold.

DETAILED DESCRIPTION OF THE INVENTION

Figure 3:
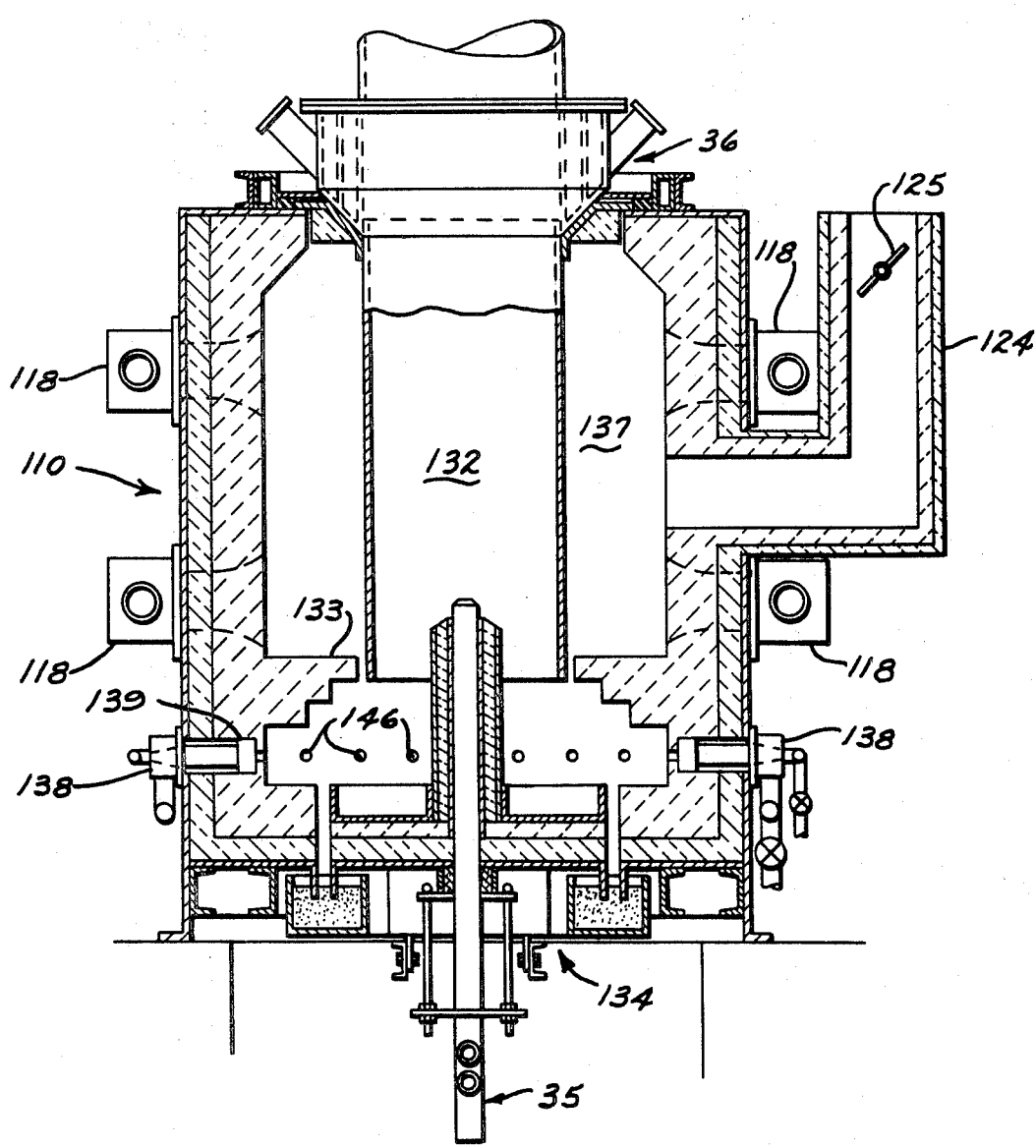
FIG. 3 is a sectional elevational view of a particle heat treating furnace similar to FIG. 1 having radiant type burners for radiantly heating the walls of the heating chamber.

Referring to FIGS. 1 and 2 of the drawings, the particle heating furnace 10 comprises a refractory cubicle or housing 12 surrounded by a layer of insulative material 14 and an outer metal casing 16. Burners 18 supply a mixture of fuel and air for combustion within the housing 12 to produce a flow of hot gases. These burners are disposed so that the combustion products emanating from them are directed to circulate around the inside of the refractory housing and caused to be intermixed. The intermixing results in an equalization or moderation of both the temperatures and velocities of the combustion products. Preferably at least some of the burners 18 are the combustor type that will operate, under normal conditions, with air in excess of stoichiometric proportion to fuel but may be operated with fuel and air being supplied in stoichiometric proportions. Satisfactory results could also be obtained if at least some of the burners were of the fuel rich type that operate, under normal conditions, with an excess proportion of fuel and a deficiency of air. The fuel and air are supplied under pressure to the burners 18 through separate conduits 19 and 20 with valves 21 and 22 respectively, for regulating the fuel input independently of the air input. Thus, the heat and volumetric output of the combustion system may be varied independently of each other. An opening 23 in one wall of the housing 12 is provided for exhausting a portion of the combustion products through an insulated and refractory lined flue 24 communicating with the opening 23. The flow of flue gases out of the flue is controlled by a damper 25 which may be adjustable in response to furnace pressure. Aligned top and bottom openings 26 and 28, respectively, are provided in the refractory housing 12 and metal casing 16 for removably holding a particle heat treating cell 30.

Preferably the heat treating cell 30 comprises separable parts including a vertically disposed heating chamber shell 32 with open ends, a bottom closure assembly 34 containing a particle injection or launch device 35, and a quench chamber defined by a manifold 36 at the top end of the heating chamber shell. The heating chamber shell 32 is spaced inwardly from the refractory housing 12 and extends between the top and bottom openings of the refractory housing so as to define a primary combustion and distribution chamber 37 between the shell 32 and housing 12. The shell 32 is suspended from the top openings 26 of the housing 12 by an annular collar 38 attached to the outside of the shell slightly below its top edge. This collar 38 extends outwardly a sufficient distance to provide engagement with the marginal edge of the top opening 26. Insulation 40 is provided on the underside of the annular collar 38 in order to maintain the adjacent section of the heating chamber shell at a high temperature and to reduce the heat loss out of the combustion chamber and heat transfer into the adjacent quench manifold 36. The heating chamber shell 32 may be made from cylindrical sections of heat and oxidation resistant metal, such as Inconel. The top section 42 has an imperforate wall which may be of a lesser diameter than the concentric bottom or base section wall 44 which has a multiplicity of uniformly distributed hot gas entry ports or apertures 46. Good results were obtained with the total open area of the gas entry ports being selected so as to give a gas entrance pressure of about 2" of water column under normal operating conditions. A substantially horizontally disposed annular flange member 48 bridges the radially offset adjacent ends of the top and bottom sections 42 and 44. This offset tends to protect the ports 46 from being clogged by any fused product which collects on, and flows down, the heated imperforate wall 42 of the heating chamber shell 32. Additional protection may be afforded by upturning the flange 48 or by attaching an annular stripping rod 50 to the inner portion of the flange 48 so that downwardly flowing fused product will have a greater tendency to fall from the flange rather than continue to adhere to, and flow along, its surface.

The bottom closure assembly 34 is removably held within the heating chamber base section 44 by support brackets 54 which are bolted to frame members 56 depending from the bottom of the furnace. Covering the top surface of the closure member is a residue pan 58 for holding fused or partially fused product which has fallen from the heating chamber wall or out of the particle conveying air stream. The particle launching device 35 extends upwardly through the center of the closure member 34 and the residue pan 58. The tip or outlet end of the launch device 35 protrudes substantially above the ported base section 44 of the heating chamber shell and may be adjustably positioned vertically by threaded means 62 attached between the launch device and a bracket 64 affixed to the bottom of the closure member. An annular seal trough 66 containing a sealant, such as sand, is also carried upon the support brackets 54. Annular flanges 68 and 70, respectively, depend into the sealant from the periphery of the bottom of the closure member 34 and from the edge of the bottom opening 28 of the refractory housing 12. The lower edge or free end of the heating chamber shell 32 also dips into the sealant and remains sealed thereby even though the shell expands and contracts in response to temperature changes within the furnace. By sealing this edge, it is assured that the hot gases from the combustion chamber 37 will enter the heating chamber shell only through the gas entry ports 46.

The vertically disposed launch device 35, shown in detail in FIG. 5, is adapted for use with heat fusible solid particles. In order to keep the temperature of the launch device 35 below the fusible temperature of the particles, it is provided with a tubular water jacket 72 having two concentric annular passageways 74 and 76 sealed at their bottom ends and communicating with each other at their top ends. Cooling fluid, such as water, enters the jacket 72 through a water line inlet 78 adjacent the bottom of the outer annular passageway 74 where it is circulated upwardly into the inner passageway 76 where it then flows downwardly and finally out through water line 80. The portion of the water jacket 72 which extends into the furnace is insulated by a surrounding heat shield 82 (see FIGS. 1, 3, and 4). The inner wall 84 of the water jacket 72 concentrically surrounds a dispersion tube 86 so as to define an annular conduit 88 for launching the particles into the heating chamber. Particles may be supplied to this annulus 88 by means of an auger 90 which transports the particles out of the bottom of the hopper 92 into a vertical tube 93 which has an atmospheric vent 94. The particles fall in front of a compressed air stream flowing out of valve controlled air line 95 through a nozzle 96 at the bottom end of the tube 93. From there the particles entrained in the air stream are pneumatically carried into the launch tube annulus 88 via feed line 98, then upwardly through the annulus 88 and out its open end into the updraft of hot furnace gases.

To compensate for the localized cooling caused by the injection of pressurized cool air from the launching device 35 into the heating chamber, a regulated amount of fuel gas may be supplied into the particle feed annulus 88 by a fuel line tap 100 located above the feed line 98. The supplementary fuel burns very rapidly upon mixing with the hot furnace gases. Under these conditions, the combustion of the additional fuel uniformly compensates for the above mentioned localized cooling without producing a flame that has a widely divergent temperature gradient.

Although the compressed air used to launch the particles does tend to expand upon exiting the launch tube annulus 88, dispersion of the particles caused by this expansion is generally found to be insufficient. The particles tend to concentrate in the core of the heating chamber 42. Therefore, the aforementioned dispersion tube 86 is provided in the center of the particle feed conduit to give the surrounding stream of particles a controlled amount of lateral momentum. A valve controlled compressed air or fuel gas line 102 is connected to the bottom end of the dispersion tube 86. Thus, the velocities of the launch and dispersion gases may be varied relative to each other so that an effective particle dispersion may be achieved over a wide range of particle feed rates and conveying gas stream velocities. The tip end of the dispersion tube 86 extends slightly beyond the end of the particle feed annulus 88 and its inner surface 104 diverges in a downstream direction. A flat disc or dispersion cap 106, preferably having an outside diameter the same as or slightly less than the outer diameter of dispersion tube 86, is mounted transversely across the open end of this tube a short distance above its outlet end. The cap 106 may have a plurality of small apertures which provide a total open area in the apertured cap of about 20%. The air flowing through these apertures prevents build-up of fused product which occurs when an imperforate dispersion cap is used.

The aforementioned quench manifold 36, located at the top of the heating chamber shell 32, rests upon the heating chamber collar 38, and its lower end conforms with the top surface configuration of the collar 38. An annular flange 112 extends radialy outwardly from the manifold beyond the collar 38 to accommodate a fluid cooled ring 114 attached around its outer edge. A sealing member 116 is provided beneath the flange between the ring and the periphery collar to prevent the escape of hot gases from the combustion chamber. The quench chamber or manifold 36 is divided into two annular compartments by an apertured partition 118 disposed between the outer and inner walls 120 and 122, respectively, of the manifold. A cooling fluid, such as air, is injected into the manifold through angularly disposed inlet ducts 124 attached to the outer wall 120 of the manifold opposite each other. The apertured partition 118 serves to distribute the entering quench fluid uniformly around the inner compartment of the manifold. The inner wall 122 of the quench manifold has a multiplicity of apertures 126 which may be variously sized or spaced so that the open area per unit of wall area increases in a direction from the bottom of the manifold to its top. Consequently, the quench fluid is injected laterally into the stream of particles and hot gases flowing out of the top of the heating chamber shell 32 at a rate which increases in proportion to distance from the heating chamber. The momentum of the quench fluid exiting the quench manifold adjacent the heating chamber is less than that exiting the quench manifold adjacent its top. This arrangement allows the cooling quench fluid to ultimately penetrate the hot gas stream deeply without causing drastic cooling of the top portion of the heating chamber due to a strong backflow or eddying of the quench fluid into the heating chamber. When the diameter of the quench zone is large, an apertured or air permeable tube such as a cylindrical screen 127 having a curtain of outflowing air or quench fluid may be centrally positioned in the quench zone to reduce the radial distance which the quench fluid is required to penetrate (see FIGS. 1 and 4). Thus the flow of quench fluids from the cooled surfaces of the quench zone aerodynamically shields these surfaces against fused particle impingement and build-up.

A collection device (not shown), such as a cyclone separator or filter type recovery unit, may be connected to the duct section 128 mounted on top of the quench manifold 36.

In operation, the burners 18 fire in directions substantially tangential to the heating chamber shell 32 so that their combustion products whirl about the cylindrical shell 32, thereby uniformly heating it to the desired temperature, which is usually in the radiant temperature range. The products of combustion then enter the heat treating cell 30 through peripherally disposed gas entry ports 46 in the enlarged bottom portion 44 of the heating chamber shell 32 and flow inwardly and upwardly through the concentrically reduced upper portion 42. This structure gives the hot gases flowing through the heat treating chamber relatively uniform velocity and temperature profiles. The rate of flow of these gases may be controlled by the quantity of fuel and air supplied through the burners 18 and also by the flue damper 25. With this arrangement the temperature and velocity of these gases and the temperature of the top section 42 of the heating chamber shell 32 may be altered independently of each other.

Particles to be heat treated are pneumatically directed upwardly out of the annular section 88 of the particle launch device 35 and are deflected and uniformly dispersed radially outwardly by compressed air or fuel gas that strikes the dispersion cap 106. The particles are heat treated by convection and radiant heat during their residence time in the top section 42 of the heating chamber shell 32. The residence time is determined primarily by the aerodynamics of each particle and the velocity of the updraft of hot gases.

The heat treated particles are conveyed by the updraft into the quench zone where they are cooled by laterally injected cooling fluid and ultimately conveyed to a collection device.

The particle heat treating furnace 110 shown in FIG. 3 is similar to that shown in FIGS. 1 and 2, but has radiant type burners 118 which fire into a refractory lined combustion chamber 137 containing the particle heating chamber shell 132. These burners 118 provide an efficient means for heating the wall of the heating chamber shell 132 to a high temperature, such as in the radiant temperature range. Fuel and air are supplied to the burners 118 in stoichiometric proportions and adjustable amounts. At the bottom end of the combustion chamber 137 above the lower open end of the heating chamber shell 132, an annular barrier 133 extends between the refractory lining 114 and the shell end to limit the flow of combustion products or hot gases out of or into this combustion chamber 137. The gases for conveying and convectively heating the particles are primarily supplied by burners 138, which may be of the aforementioned excess air or excess fuel type, that fire into a distribution chamber 139 located in the refractory lining beneath the barrier 133. The side wall of the distribution chamber 139, on the side opposite from the burners 138, contains a plurality of ports 146 which communicate with the open bottom end of the heating chamber shell 132. These ports 146 are offset outwardly from beneath this open bottom end. The particle launch device 35 is contained in a closure assembly 134 sealed to the bottom of the furnace 110. A quench manifold 36 may be provided adjacent the open top end of the heating chamber shell 132. Controls, similar to those shown in FIG. 1, may be provided to regulate the input amounts and ratios of fuel and air to the burners 118 and 138. Control means, such as an adjustable damper 125 in the combustion chamber flue 124, is provided for regulating the operating pressure within the furnace 110. Furnace pressure may also be regulated by control means associated with a collection device (not shown) located downstream from the quench manifold 36.

FIG. 4 shows a particle heat treating furnace 210 similar to the previously described furnace 10 but embodying a particle heating chamber 232 made of a refractory material. The heat treating chambers of furnaces 10, 110, and 210 have approximately the same internal configuration. Although these heating chambers are shown as having circular cross sections and containing only one particle launch device 35, their cross sections could be elongated or made rectangular and made to hold a plurality of launch devices 35. The furnace 210 is provided with an annular combustion or distribution chamber 239 which is located within the refractory wall of its enlarged base section 244. Burners 238, such as the aforementioned combustor type with valve controlled fuel and air supply lines 240 and 242 respectively, fire into the distribution chamber 239. The wall section, between the distribution chamber 239 and the internal surface of base section 244, contains entry ports 246 for the passage of combustion products from the distribution chamber to the heating chamber. The number and location of the ports 246 and burners 238 and also the size of the ports are selected so that the combustion products or hot gases will be distributed and supplied at substantially uniform temperatures and velocities from around the periphery of the heating chamber 232. The ported wall, partially isolating the distribution chamber from the heat treating chamber, provides a simple and economical means for the uniform distribution of combustion products with a minimum of burners and related burner equipment. The temperatures and velocities of the hot gases may be controlled independently of each other by varying the ratios and amounts of fuel and air supplied to the burners 238. A stripper rod 250 is provided at the offset between the enlarged base section 244 and the smaller upper portion of the heating chamber so as to prevent the clogging of the entry ports 246 by the downflow of fused product which accumulates on the heating chamber walls during operation.

The top of the heating chamber 232 may be provided with a peripherally disposed means for producing an exothermic reaction such as an after-burner or secondary burner 248 to compensate for the radiant heat loss into the cold or black surface of the adjacent quench manifold or chamber 236. Preferably the burner 248 fires in a direction normal to the mass flow of particles through the heating chamber. If fuel rich burners are used instead of excess air burners for producing the hot gases, then an exzothermic reaction may be produced by merely introducing air or oxygen through the burner structure 248 into the upwardly flowing hot gases containing a portion of uncombusted fuel. The quench manifold 236 located immediately above this burner 248 is structurally similar and functionally the same as the previously described quench manifold 36. Thus, the combustion products from burner 248 and the adjacent quench fluids from the quench manifold 236 travel in the same directions towards the center of the particle stream. The directed flow of these combustion products operates as a barrier which minimizes the backflow of cooled quench fluids into the heating chamber, promotes uniform temperature in the heating chamber, and produces a sharp temperature gradient between adjacent ends of the heating and quenching zone chambers. The particle launch device 35 shown in this embodiment is the same as that described with reference to particle heat treating furnace 10 and shown in detail in FIG. 5.

FIG. 6 shows a plural cell embodiment in which five heat treating cells 260, each similar to that of FIG. 1, are disposed in one refractory chamber 262 and are connected by ducts to a common collection system manifold 264. The interchangeability of similar parts and the separability of the basic assemblies are of great advantage in reducing down time and maintenance costs in this embodiment and even in the single cell embodiments.

While the best modes known to us to carry out this invention have been described in connection with specific arrangements of parts, it should be expressly understood that various modifications of the above will be apparent to those skilled in the art without departing from the scope of the invention which is defined only by the appended claims.

We claim:

1. A furnace apparatus for discretely heat treating particles and conveying them upwardly to a collection device, said apparatus comprising: a particle heat treating chamber which is vertically disposed, a distribution chamber for supplying hot gases to said heat treating chamber at a rate sufficient to carry said particles upwardly therethrough, said distribution chamber having a wall member located adjacent the bottom end of said heat treating chamber which member defines a plurality of uniformly distributed ports communicating between said chambers, and means for dispersively injecting said particles into said heat treating chamber at a point above said distributing chamber ports.

2. A furnace apparatus according to claim 1 wherein said hot gases are produced by a plurality of burners which fire into said distribution chamber; said apparatus further including means for separately supplying fuel and air under pressure to said burners, and means for controlling the amounts of said fuel and air supplied to said burners thereby permitting the temperature and the velocity of said hot gases to be varied independently of each other.

3. A furnace apparatus according to claim 2 wherein at least some of said burners are of the variable ratio fuel-air type which have means for controlling the fuel and air input ratio.

4. An apparatus according to claim 1 wherein said particle injecting means comprises: a particle feed tube member containing a concentric pneumatic conduit cooperating therewith to define an annular space for conveying said particles between said tube and said conduit, and a dispersion cap spaced a short distance beyond the outlet end of said pneumatic conduit whereby compressed gases flowing out of the pneumatic conduit under pressure are deflected laterally by the dispersion cap and thereby assist in the dispersion of the particles launched from the adjacent outlet end of said particle conveying annular space surrounding said conduit.

5. An apparatus according to claim 1 further including a means for supplying gases to produce an exothermic reaction adjacent the upper end of said heat treating chamber.

6. An apparatus according to claim 1 further including a quench manifold wall defining a quench chamber located adjacent the upper end of said heat treating chamber and a means for injecting quench fluids under positive pressure into said quench chamber in a direction lateral to the mass flow of particles entering said quench chamber.

7. An apparatus according to claim 6 further including a means for supplying gases to produce an exothermic reaction adjacent the quench end of said heat treating chamber, said gases having an input direction the same as that of the quench fluids whereby a dynamic barrier is provided by the stream of said gases so as to prevent the backflow of quench fluids into said heat treating chamber and also to produce a sharp temperature gradient between adjacent ends of said heat treating and quench chambers.

8. An apparatus according to claim 6 wherein said means for injecting said quench fluids includes a means for injecting said quench fluids at a rate which increases within said quench chamber in proportion to the distance away from the top of said heat treating chamber end of said quench manifold.

9. An apparatus according to claim 6 wherein said quench fluids are injected into said quench chamber through apertures in said quench manifold and the open area provided by said apertures per unit of quench manifold wall area increases in proportion to the distance away from the heat treating chamber end of said quench manifold.

10. An apparatus according to claim 6 wherein said quench chamber is provided with a centrally disposed air permeable member for injecting quench fluid outwardly from said member towards said quench manifold wall.

11. A furnace for heat treating discrete particles at their heat fusible temperature, said furnace comprising: a heating zone chamber having an upright imperforate side wall section heated to a temperature at least equal to the heat of fusion of said particles, means for dispersively injecting said particles into said chamber, means for supplying hot gases at a velocity capable of suspending said particles in said chamber and conveying said particles through said chamber, said hot gas supplying means including entry means for said hot gases located adjacent the lower end of said side wall section, and baffle means between said lower end and said entry means whereby said entry means is protected from the downward flow of fused product which accumulates on said heated side wall during operation of the furnace.

12. An apparatus according to claim 11 wherein said side wall section is enclosed by a refractory housing spaced outwardly from said chamber, and a plurality of burners fire into the space between said chamber and said housing causing said side wall to be heated to a radiant temperature and supplying said hot gases.

13. An apparatus according to claim 12 wherein at least some of said burners are radiant type burners.

14. A furnace apparatus for discretely heat treating particles and conveying them upwardly to a collection device, said apparatus comprising: a vertically disposed heat treating chamber, a housing defining a distribution chamber around said heat treating chamber, means for injecting particles to be heat treated into the lower end of said heat treating chamber, and means for uniformly supplying combustion products into the lower end of said heat treating chamber from said distribution chamber and for creating an updraft of such combustion products for pneumatically conveying said injected particles through said heat treating chamber.

15. A furnace apparatus according to claim 14 wherein said combustion products are supplied by burners of the variable ratio fuel-air type which have means for controlling the fuel and air input ratio and wherein said combination further includes a combustion chamber flue with an adjustable damper whereby the temperature and velocity of the combustion products entering the combustion chamber are capable of being regulated independently of each other.

16. A furnace apparatus for heat treating discrete particles at their heat fusible temperature and thereafter quenching said particles during their aerodynamic suspension in a gaseous medium by which they are heated and conveyed through the furnace to a collection device, said furnace comprising: a chamber with a heating zone having an upright wall maintained at a temperature at least equal to the heat of fusion of said particles, entry means for a stream of particles heating and conveying gases, said entry means being located adjacent the lower end of said wall and abruptly offset outwardly therefrom, and means for injecting said particles into the stream of said heating and conveying gases, whereby any fusible particles which strike said upright wall of the heating zone and accumulate thereon will remain in their fusible state due to the temperature of said wall and tend to flow to the bottom edge of said wall from which they drop without impairing the effectiveness of said heating and conveying gas entry means.

17. A furnace apparatus according to claim 16 further including a quench chamber having an apertured wall located directly above said heating zone, and means for injecting a stream of quench fluid through said apertured wall into said quench chamber laterally with respect to said quench chamber wall whereby particles are prevented from impinging and collecting on the cold wall of said quench chamber by means of the lateral flow of quench fluids.

18. A furnace according to claim 16 wherein said heating zone wall is surrounded by a refractory housing spaced outwardly from said heating zone wall, and a plurality of burners associated with said housing fire into the space between said housing and said wall to maintain said wall at said temperature.

19. A furnace according to claim 16 wherein means is provided at the top of said heating zone adjacent said quench zone for injecting combustion supporting gas streams laterally with respect to said heating zone wall.

20. A particle launching device for launching and dispersing particles into a heated gaseous stream of a furnace, said device comprising: a particle feed tube member containing a concentric conduit cooperating with said tube to define an annular chamber between said tube and said conduit, said chamber and said conduit having open outlet ends adjacent each other, means for conveying particles through said chamber to said outlet end, and means located beyond the outlet end of said conduit and cooperating with compressed gases emanating from said conduit for dispersing said particles.

21. A particle launching device, according to claim 20, wherein said means for dispersing said particles comprises an apertured disc confronting the outlet end of said conduit.

22. A particle launching device, according to claim 20, for launching particles in a heated environment wherein said launch device has a fluid cooled jacket.

23. A device according to claim 22 wherein said fluid cooled jacket is surrounded by a heat shield.

24. A method of heat treating particles comprising the steps of: dispersively launching a stream of particles to be heat treated into a heating chamber, heat treating said stream of particles while conveying said stream of particles through said heating chamber, cooling the particles in said stream by subjecting the stream of particles flowing out of the heating chamber to quench fluids which are positively injected from a surrounding quench manifold into said stream of particles laterally with respect to the mass flow of said particles out of said heating chamber and which fluids are injected at a rate which increases from a minimum adjacent the heating chamber to a maximum adjacent the remote end of said quench manifold.

References Cited

UNITED STATES PATENTS

| | | | |
|---|---|---|---|
| 2,455,907 | 12/1948 | Slayter | 65—16 |
| 2,619,776 | 12/1952 | Potters | 65—21 |
| 2,838,881 | 6/1958 | Plumat | 65—335X |

ARTHUR D. KELLOGG, Primary Examiner

U.S. Cl. X.R.

65—142, 335